United States Patent
Yeh et al.

(10) Patent No.: US 8,805,283 B2
(45) Date of Patent: Aug. 12, 2014

(54) INTER-CELL INTERFERENCE RELIEF METHOD

(75) Inventors: Choong Il Yeh, Daejeon (KR); Young Seog Song, Daejeon (KR); Seung Joon Lee, Daejeon (KR); Byung-Jae Kwak, Seoul (KR); Ji Hyung Kim, Daejeon (KR); Dong Seung Kwon, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 529 days.

(21) Appl. No.: 12/811,785

(22) PCT Filed: Jan. 16, 2009

(86) PCT No.: PCT/KR2009/000240
§ 371 (c)(1),
(2), (4) Date: Jul. 6, 2010

(87) PCT Pub. No.: WO2009/091208
PCT Pub. Date: Jul. 23, 2009

(65) Prior Publication Data
US 2010/0279619 A1    Nov. 4, 2010

(30) Foreign Application Priority Data

Jan. 16, 2008  (KR) .................. 10-2008-0004712
Jan. 15, 2009  (KR) .................. 10-2009-0003509

(51) Int. Cl.
*H04B 1/00*  (2006.01)

(52) U.S. Cl.
USPC .................. 455/63.1; 455/67.11; 455/426.11

(58) Field of Classification Search
CPC ........................................................ H04B 7/024
USPC .................. 455/63.1, 67.11, 426.11
See application file for complete search history.

(56) References Cited

U.S. PATENT DOCUMENTS

| | | | |
|---|---|---|---|
| 2006/0104382 A1* | 5/2006 | Yang et al. | 375/267 |
| 2006/0120477 A1 | 6/2006 | Shen et al. | |
| 2007/0040704 A1 | 2/2007 | Smee et al. | |
| 2007/0066229 A1* | 3/2007 | Zhang et al. | 455/67.11 |
| 2008/0132262 A1 | 6/2008 | Jung et al. | |
| 2008/0212530 A1 | 9/2008 | Carvalho et al. | |
| 2008/0268834 A1* | 10/2008 | Foschini et al. | 455/426.1 |

FOREIGN PATENT DOCUMENTS

| | | | | |
|---|---|---|---|---|
| CA | WO2005122622 | * | 12/2005 | H04Q 7/38 |
| EP | 1 804 395 A1 | | 7/2007 | |
| KR | 10-2008-0037398 A | | 4/2008 | |
| KR | 10-2008-0073399 A | | 8/2008 | |

(Continued)

OTHER PUBLICATIONS

Marc C. Necker, Coordinated Fractional Frequency Reuse, Oct. 2007, pp. 296-305, Proc. ACM MSWIM, Chania, Crete Island, Greece.

Choong Il Yeh et al., Frame Structure to Support Inter-cell Interference Mitigation for Downlink Traffic Channel using Co-MIMO and FFR, IEEE C802.16m-08/017, Jan. 16, 2008.

(Continued)

*Primary Examiner* — Hsin-Chun Liao
(74) *Attorney, Agent, or Firm* — Jefferson IP Law, LLP

(57) ABSTRACT

In a method of mitigating inter-cell interference, terminals are grouped into groups. A base station transmits data to a first terminal belonging to a first group among the groups, without cooperation with a neighboring base station. The base station transmits data to a second terminal belonging to a second group among the groups, through cooperation with the neighboring base station.

20 Claims, 9 Drawing Sheets

(56) References Cited

FOREIGN PATENT DOCUMENTS

| | | |
|---|---|---|
| KR | 10-2008-0080731 A | 9/2008 |
| KR | 10-2008-0101269 A | 11/2008 |
| WO | 2006/063138 A2 | 6/2006 |
| WO | 2007/123029 A1 | 11/2007 |
| WO | 2008/140268 A2 | 11/2008 |

OTHER PUBLICATIONS

Jia Liu et al., On the Capacity of Multiuser MIMO Networks with Interference, IEEE Transactions on Wireless Communications, Feb. 2008, vol. 7, No. 2.

Choong Il Yeh et al., Network Coordinated Beamforming, IEEE 802.16m-08/374r1, May 8, 2008.

* cited by examiner

INTER-CELL INTERFERENCE RELIEF METHOD

TECHNICAL FIELD

The present invention relates to a method of mitigating inter-cell interference.

BACKGROUND ART

When k channels using the same frequency resource are allocated in a wireless network consisting of N cells, a frequency reuse factor (FRF) may be defined to be k/N.

In order to mitigate inter-cell interference, when constituting the wireless network, a cellular system is changing from a scheme of not allocating the same frequency to neighboring cells (generally, FRF<1/7) to a scheme of allocating the same frequency to the neighboring cells (FRF=1). Also, an inter-cell interference mitigating algorithm is changing from a scheme that is embodied at a receiver side to a scheme that is embodied at a transmitter side, that is, to a fractional frequency reuse (FFR) scheme or a network multiple input multiple output (MIMO) scheme.

The FFR scheme may obtain a large FRF value to thereby enhance spectrum use efficiency. The FFR scheme may be classified into a hard FFR scheme and a soft FFR scheme.

The hard FFR scheme does not allow neighboring cells to use the same frequency in a cell boundary region in order to mitigate inter-cell interference in a network. Particularly, in an orthogonal frequency division multiple access (OFDMA) system, the neighboring cells do not allocate the same subcarriers to terminals, located in the cell boundary region, due to cooperation among the neighboring cells. Unlike the hard FFR scheme, the soft FFR scheme allows the neighboring cells to use specific subcarriers, but may mitigate the inter-cell interference in the network by adjusting transmission power of the specific subcarriers to mitigate the inter-cell interference through cooperation of the neighboring cells.

In the network MIMO scheme, antennas installed at base stations of the neighboring cells may cooperatively perform MIMO transmission/reception to thereby mitigate the inter-cell interference or to enhance system performance.

DETAILED DESCRIPTION

Technical Problem

In order to induce a fractional frequency reuse (FFR) scheme and a network multiple input multiple output (MIMO) scheme in a cellular system, a network cooperation scheme, a required measurement, a procedure, and the like may need to be defined, whereas these schemes are proposed at independently conceptual levels.

The present invention has been made in effort to provide a method and an apparatus for mitigating inter-cell interference having advantages of mitigating the inter-cell interference by cooperatively using the FFR scheme and the network MIMO scheme.

Technical Solution

An embodiment of the present invention provides a method of mitigating inter-cell interference at a base station. The method may include: grouping a plurality of terminals into a plurality of groups; transmitting first data to a first terminal belonging to a first group among the plurality of groups without cooperation with a neighboring base station; and transmitting second data to a second terminal belonging to a second group among the plurality of groups through cooperation with the neighboring base station.

Another embodiment of the present invention provides a method of mitigating inter-cell interference at a terminal. The method may include: transmitting feedback information to a serving base station; receiving first data from the serving base station without cooperation with a neighboring base station, when the terminal belongs to a first group based on the feedback information; and receiving second data through cooperation between the serving base station and the neighboring base station, when the terminal belongs to a second group based on the feedback information.

Yet another embodiment of the present invention provides a method of mitigating inter-cell interference at a base station. The method may include: grouping a plurality of terminals into a plurality of groups; not applying a network multiple input multiple output (MIMO) scheme to a terminal belonging to a first group among the plurality of groups; and applying, to a terminal belonging to a second group among the plurality of groups, the network MIMO scheme through cooperation with a neighboring base station.

Advantageous Effects

According to an embodiment of the present invention, it is possible to mitigate inter-cell interference in a cell boundary by transmitting data through cooperation between base stations according to a location of a terminal and an SINR, or by transmitting the data without cooperation between the base stations.

Also, according to an embodiment of the present invention, it is possible to enhance performance in a cell boundary by appropriately adopting a network multiple input multiple output (MIMO) scheme, a fractional frequency reuse (FFR) scheme, and the like, according to a location of a terminal.

MODE FOR INVENTION

Figure 1:
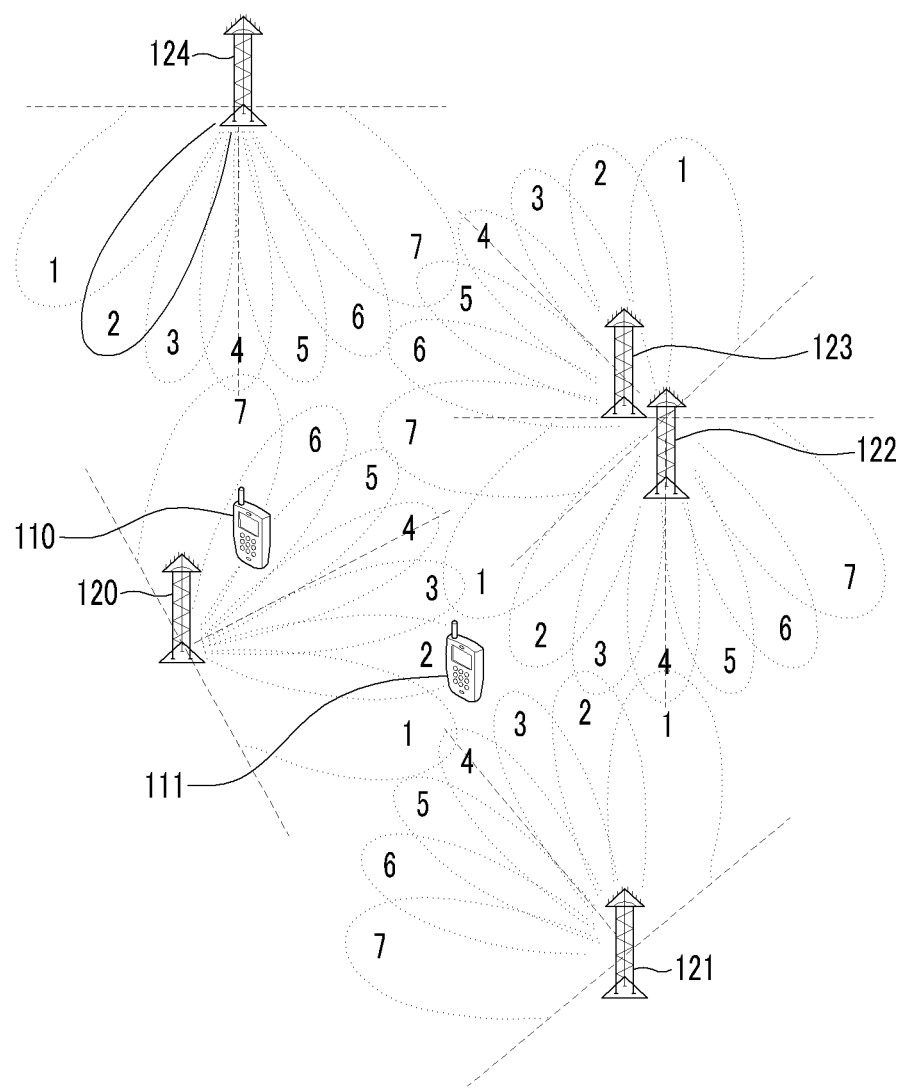
FIG. 1 is a schematic diagram illustrating a cellular system according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

In this specification, a terminal may designate a mobile station (MS), a mobile terminal (MT), a subscriber station (SS), a portable subscriber station (PSS), user equipment (UE), an access terminal (AT), etc., and may include functions of all or a part of the terminal, the mobile terminal, the subscriber station, the portable subscriber station, the user equipment, the access terminal, and the like.

In this specification, a base station (BS) may represent an access point (AP), a radio access station (RAS), a node B, an evolved node B (eNodeB), a base transceiver station (BTS), a mobile multihop relay (MMR)-BS, and the like. Further, the base station may include functions of all or a part of the access point, the radio access station, the node B, the eNodeB, the base transceiver station, the MMR-BS, and the like.

Hereinafter, a method of mitigating inter-cell interference according to an embodiment of the present invention will be described in detail with reference to the accompanying drawings.

Figure 2:
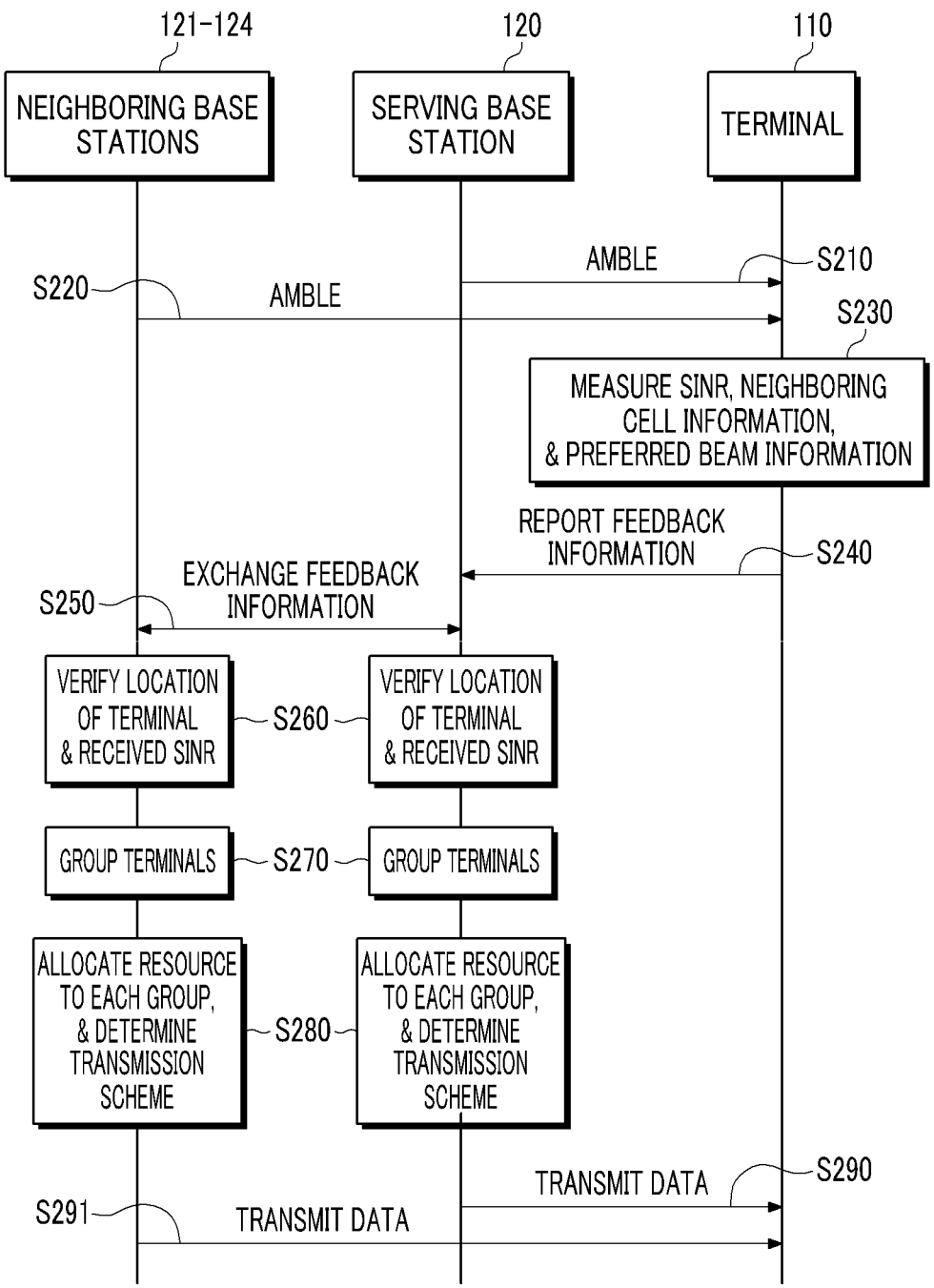
FIG. 2 is a flowchart illustrating a method of mitigating inter-cell interference according to an embodiment of the present invention.

FIG. 1 is a schematic diagram illustrating a cellular system according to an embodiment of the present invention, and FIG. 2 is a flowchart illustrating a method of mitigating inter-cell interference according to an embodiment of the present invention.

Referring to FIG. 1, a terminal 110 measures information to be fed back to a base station 120, and transmits the measured feedback information to the base station 120. The feedback information may include information on a signal to interference plus noise ratio (SINR) and a preferred beam, and may also further include information on an interference cell. Here, the interference cell denotes a cell that may affect interference to a serving cell of the terminal 110 and may also be recognized by the terminal 110. Information associated with the interference cell may include an index of the interference cell and/or an interference beam index of the interference cell. The preferred beam denotes a beam that is most preferred by the terminal 110 among a plurality of beams that a base station of a serving cell, that is, the serving base station 120, may transmit.

The base station 120 receives the feedback information from the terminal 110, determines a transmission scheme in cooperation with neighboring base stations 121, 122, 123, and 124, and transmits data to the terminal 110 according to the determined transmission scheme.

The base station 120 may transmit a cell-identifiable amble (hereinafter, referred to as "amble 1"), so that the terminal 110 may measure an SINR and an interference cell. Also, the base station 120 may transmit another amble (hereinafter, referred to as "amble 2"), so that the terminal 110 may estimate a channel for each transmitting antenna. The base station 120 may transmit the amble 1 and the amble 2 using a relatively great power, so that a terminal of a neighboring cell may also receive the amble 1 and the amble 2.

The terminal 110 estimates the channel for each transmitting antenna, using the amble 2 received from the base station 120. A channel estimation result h, which is measured by the terminal 110 for each transmitting antenna, may be expressed by a 1×M complex matrix, where $h \in C^{1 \times M}$. Here, C denotes a complex number and M denotes a number of transmitting antennas of the base station 120. The terminal 110 calculates a channel direction using the channel estimation result h, as shown in the following Equation 1, and determines a preferred beam index m using the channel direction and a codebook $c_n$ that the terminal 110 shares with the base station 120. The codebook ($\{c_n \in C^{M \times 1} | n=0, 1, 2, \ldots, L-1\}$) includes L beams of which directions are determined between the terminal 110 and the base station 120. When L beam indexes are $\{0, 1, 2, \ldots, L-1\}$, the preferred beam index m may be expressed by the following Equation 2.

$$\hat{h} = h / \|h\|. \qquad \text{(Equation 1)}$$

$$m = \arg\max_{0 \le n \le L-1} |\hat{h} c_n^*|. \qquad \text{(Equation 2)}$$

Hereinafter, a method of mitigating inter-cell interference in a cellular system according to an embodiment of the present invention will be described.

Referring to FIG. 2, a serving base station 120 and neighboring base stations 121, 122, 123, and 124 transmit an amble 1 and an amble 2 in steps S210 and S220. Also, the serving base station 120 and the neighboring base stations 121 through 124 may combine the amble 1 and the amble 2 into a single amble to thereby transmit the combined amble.

A terminal 110 receives the amble 1 and the amble 2 from the serving base station 120 and the neighboring base stations 121 to 124 that belong to neighboring cells. In step S230, the terminal 110 measures an SINR and information on a neighboring cell using the amble 1, and measures a preferred beam among a plurality of beams of the serving base station 120, using the amble 2. In step S240, the terminal 110 reports the measured information to the serving base station 120 as feedback information. Also, the terminal 110 may report the serving base station 120 about a beam index of a beam that most affects the terminal 110, among a plurality of beams transmitted from a neighboring cell corresponding to an interference cell, and a cell index of the interference cell.

In step S250, the serving base station 120 and the neighboring base stations 121 to 124 share feedback information reported from each of terminals of a corresponding cell, through a cooperation therebetween. Through this process, the base stations 120 to 124 of the cellular system may verify information such as a location of each terminal, an SINR thereof, and the like, in operation S260. In this case, the base stations 120 to 124 may share the feedback information using a backhaul communication.

In step S270, the base stations 120 to 124 group a plurality of terminals into a plurality of groups based on the above information. In step S280, the base stations 120 to 124 classify radio resources into a resource corresponding to each of the groups, allocate a corresponding resource to each group, and determine a transmission scheme corresponding to each group. In step S290, the base station 120 transmits data according to a transmission scheme corresponding to a group to which the terminal 110 belongs, using the resource allocated to the corresponding group. In this case, the neighboring base stations 121 to 124 may transmit the data to the terminal 110 in cooperation with the serving base station 120 in step S291.

For example, when the base station 120 determines, based on the feedback information received from the terminal 110, that the SINR of the terminal 110 is high, an interference cell against the terminal 110 does not exist, and a preferred beam index of the terminal 110 is 6, the base station 120 may determine that the terminal 110 is located adjacent to the base station 120 in a region of a beam #6 of the base station 120, as shown in FIG. 1. Also, when the base station 120 determines, based on feedback information received from a terminal 111, that an SINR of the terminal 111 is low, an index of an interference cell against the terminal 111 is 3 (an index of a cell corresponding to a base station 122), and a preferred beam index of the terminal 111 is 2, the base station 120 may determine that the terminal 111 is located adjacent to a cell #3 in a region of a beam #3 of the base station 120, as shown in FIG. 1.

Hereinafter, a method of grouping a plurality of terminals into a plurality of groups will be described in detail with reference to FIGS. 3 to 5. Hereinafter, it will be described, as an example, where the plurality of terminals are grouped into three groups, and radio resource allocation regions allocated to the three groups are referred to as radio resource allocations regions 1, 2, and 3, respectively.

Figure 3:
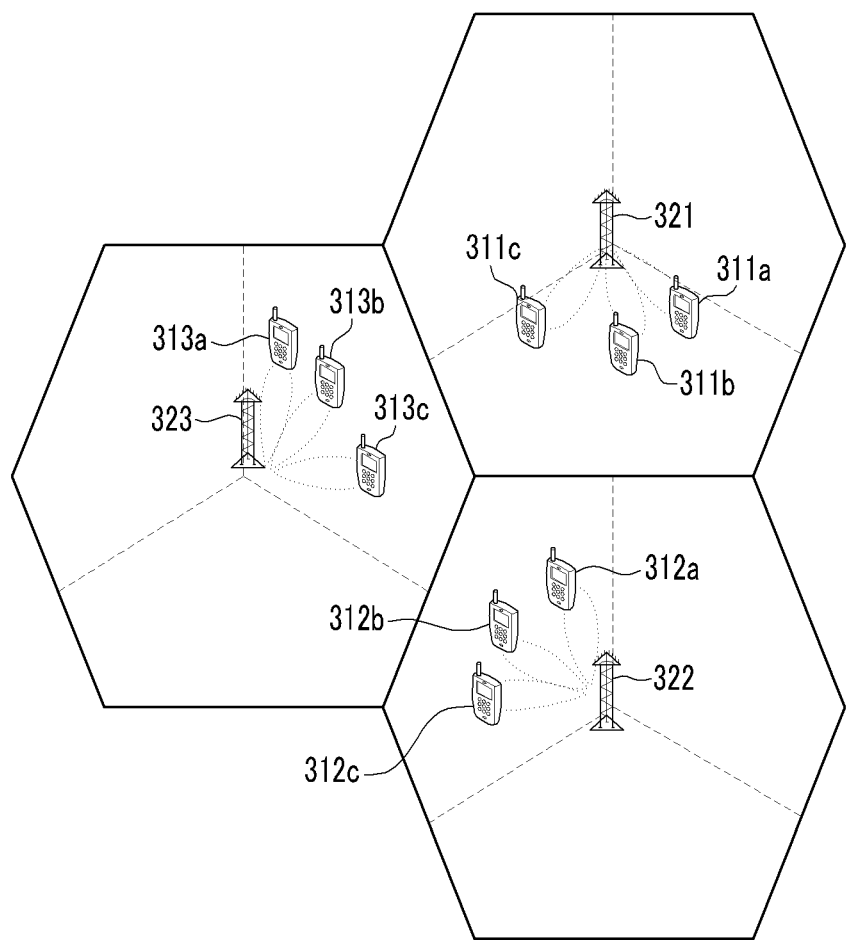
FIGS. 3 to 5 illustrate a transmission scheme in radio resource allocation regions 1, 2, and 3 according to an embodiment of the present invention.

FIG. 3 illustrates a transmission scheme in a radio resource allocation region 1 according to an embodiment of the present invention.

Referring to FIG. 3, base stations 321, 322, and 323 allocate the radio resource allocation region 1 to terminals 311a, 311b, 311c, 312a, 312b, 312c, 313a, 313b, and 313c that receive weak interference from a neighboring cell, and have a high received SINR. The terminals 311a to 313c may be located in the center of corresponding cells. In the radio resource allocation region 1, each of the base stations 321 to 323 transmits data using only its own antenna, without cooperation with a neighboring cell, that is, without using an antenna of a base station of the neighboring cell. The base stations 321 to 323 do not use a fractional frequency reuse (FFR) scheme. Accordingly, the base station 321, 322, or 323 of each cell can reuse a spectrum used at its neighboring cell, and can also apply a multi-user multiple input multiple output (MU-MIMO) scheme or a spatial multiplexing (SM) scheme for each cell. As a result, a frequency reuse factor (FRF) can have a value greater than 1. In this case, it is possible to apply partial channel status information at a transmitter side (CSIT)-based MU-MIMO scheme, a linear or non-linear full CSIT-based MU-MIMO scheme, and the like. The partial CSIT-based MU-MIMO scheme may be, for example, a codebook-based MU-MIMO scheme.

For example, as shown in FIG. 3, the base stations 321 to 323 of three neighboring cells use the same spectrum. The base stations 321 to 323 respectively transmit data to terminals 311a to 311c, 312a to 312c, or 313a to 313c having a different preferred beam index, using the MU-MIMO scheme. In this case, the FRF is 3.

Figure 4:
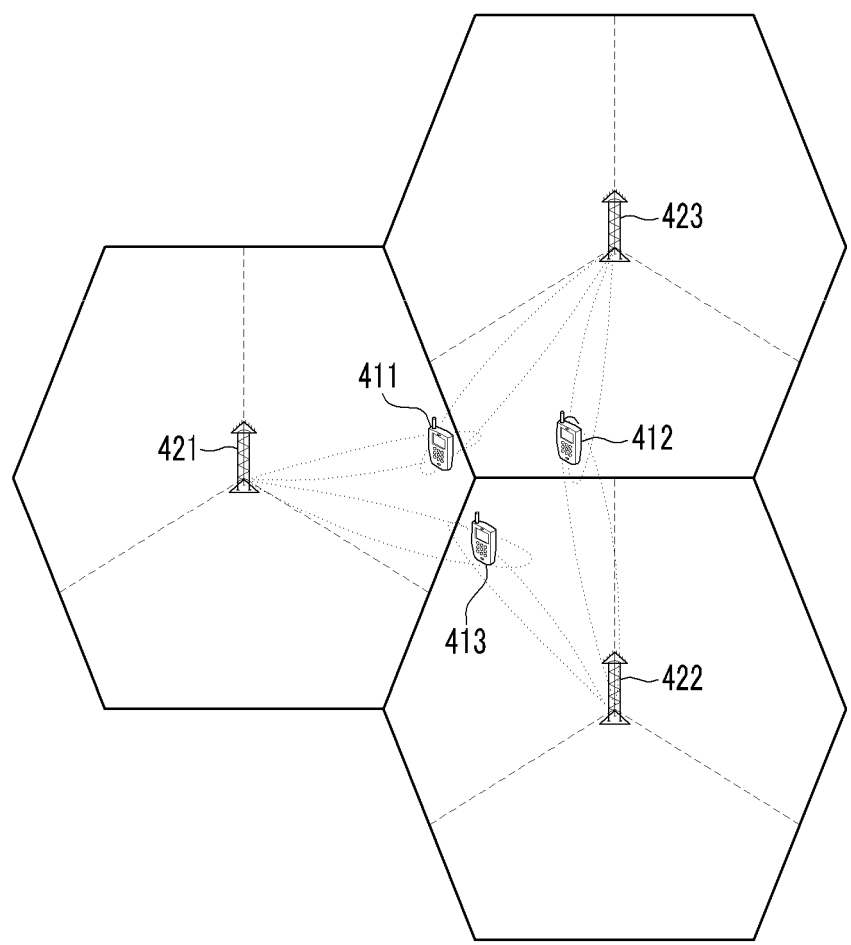

FIG. 4 illustrates a transmission scheme in a radio resource allocation 2 according to an embodiment of the present invention.

Referring to FIG. 4, base stations 421, 422, and 423 allocate the radio resource allocation region 2 to terminals 411, 412, and 413 that receive strong interference from a neighboring cell, have a low received SINR, and are spaced apart from each other. The terminals 411 to 413 are located in a cell boundary region and are sufficiently spaced apart from each other to ignore inter-beam interference. In this case, the base stations 421 to 423 may not apply an SM scheme or an MU-MIMO scheme that requires a relatively high SINR.

As described above, the terminals 411 to 413 with a strong interference cell report to the serving base stations 421 to 423 regarding feedback information including a preferred beam index. When the base stations 421 to 423 cooperate to share the feedback information, each of the base stations 421 to 423 can be aware of a location of each of the terminals 411 to 413 of the neighboring cells, using a predetermined beam location. Accordingly, each of the base stations 421 to 423 can indirectly recognize its beam index that functions as interference against each of the terminals 411 to 413 of the neighboring cells. Alternatively, when the terminals 411 to 413 report to the base stations 421 through 423 regarding a preferred beam index of a serving cell and an interference beam index of a neighboring cell, respectively, each of the base stations 421 to 423 can directly recognize its beam index that functions as interference against each of the terminals 411 to 413 of the neighboring cells through cooperation with the other base stations.

In this case, the base stations 421 to 423 may adjust beams of neighboring cells using the same frequency to not collide with each other through the cooperation, thereby mitigating interference in a cell boundary region. Also, the base stations 421 to 423 may provide macro diversity for the terminals 411 to 413 using a network MIMO scheme. The network MIMO scheme may include a collaborative MIMO scheme or a cooperative MIMO scheme. Here, when using the network MIMO scheme, receiving performance of a terminal can be enhanced, whereas backhaul overhead may be increased since a data payload is simultaneously transferred to both a serving base station and a neighboring base station. Accordingly, the network MIMO scheme may be selectively used depending on an environment.

For example, as shown in FIG. 4, the base stations 421 and 423 may simultaneously transfer data payload 1 to the terminal 411, the base stations 422 and 423 may simultaneously transfer data payload 2 to the terminal 412, and the base stations 422 and 421 may simultaneously transfer data payload 3 to the terminal 413, using the same spectrum, so that beams may not collide with each other. For this, two base stations may use the network MIMO scheme.

According to another embodiment, one of the two base stations 421 and 423 may transfer the data payload 1 to the terminal 411, one of the two base stations 422 and 423 may transfer the data payload 2 to the terminal 412, and one of the two base stations 422 and 421 may transfer the data payload 3 to the terminal 413, using beamforming. In this case, the base station may not use the network MIMO scheme.

Also, according to still another embodiment, the two base stations 421 and 423 may simultaneously transmit the data payload 1 to the terminal 411 using the same spectrum and a space time code (STC) scheme applying beamforming.

Figure 5:
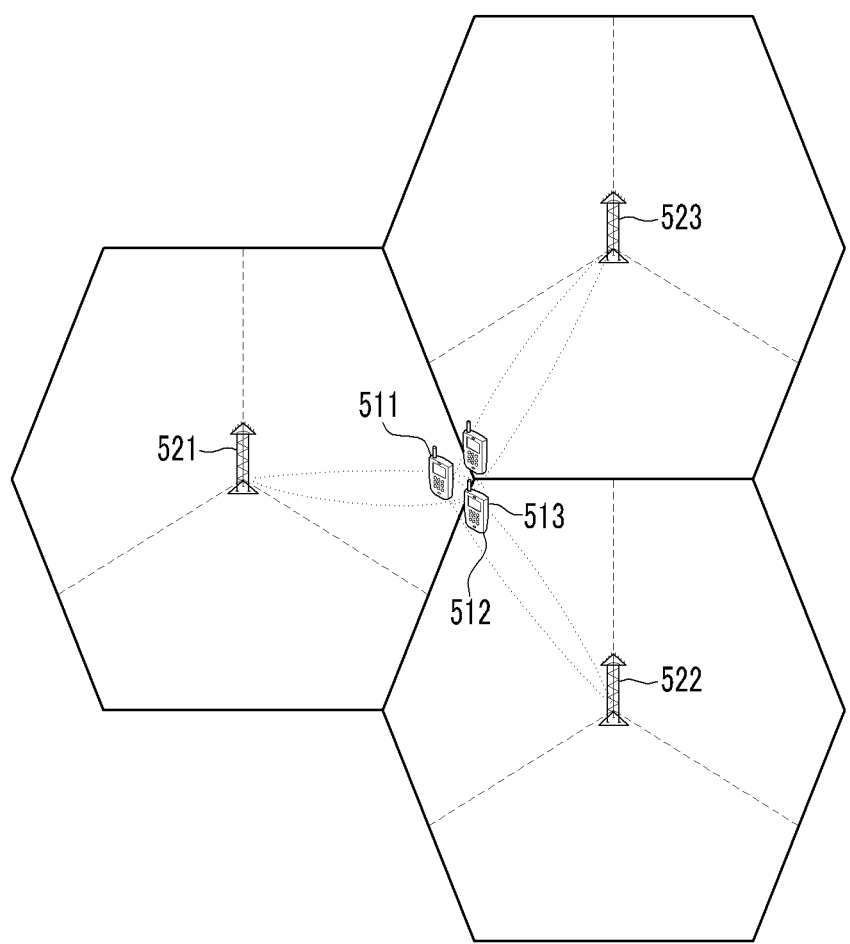

FIG. 5 illustrates a transmission scheme in a radio resource allocation region 3 according to an embodiment of the present invention.

Referring to FIG. 5, base stations 521, 522, and 523 allocate the radio resource allocation region 3 to terminals 511, 512, and 513 that receive strong interference from a neighboring cell, have a relatively low received SINR, and are clustered together with each other. The terminals 511 to 513 may be clustered around a cell boundary region. In this case, in order to mitigate inter-cell interference, the base stations 521 to 523 may simultaneously apply a network MIMO scheme and an FFR scheme, or may not apply the network MIMO scheme.

For example, as shown in FIG. 5, when a group of terminals is clustered around the cell boundary region, each of the base stations 521 to 523 may transmit the same data payload to a single terminal, for example the terminal 511 belonging to the group, using the same frequency of beam (network MIMO scheme). In this case, the base stations 521 to 523 may not use a spectrum (frequency) used for the terminal 511 for the other terminals 512 and 513 belonging to the group (FFR scheme). Then, the terminal 511 may obtain macro diversity according to the network MIMO scheme.

Also, when the network MIMO scheme is not used in order to reduce backhaul overhead, the base station 521 may transmit the data payload to the terminal 511 using a beam. The base stations 522 and 523 may transmit the data payload to the terminals 512 and 513, respectively, using resources that are different from a resource used for the terminal 511 (FFR scheme).

As described above, according to an embodiment of the present invention, a base station receives feedback information from each of terminals, groups the terminals into a plurality of groups according to a terminal location through cooperation between the base stations, and transmits data using a resource and a transmission scheme corresponding to each group. Accordingly, it is possible to mitigate inter-cell interference.

Hereinafter, a method of transmitting data using a network MIMO scheme and an STC scheme will be described with reference to FIGS. 6 and 7.

Figure 6:
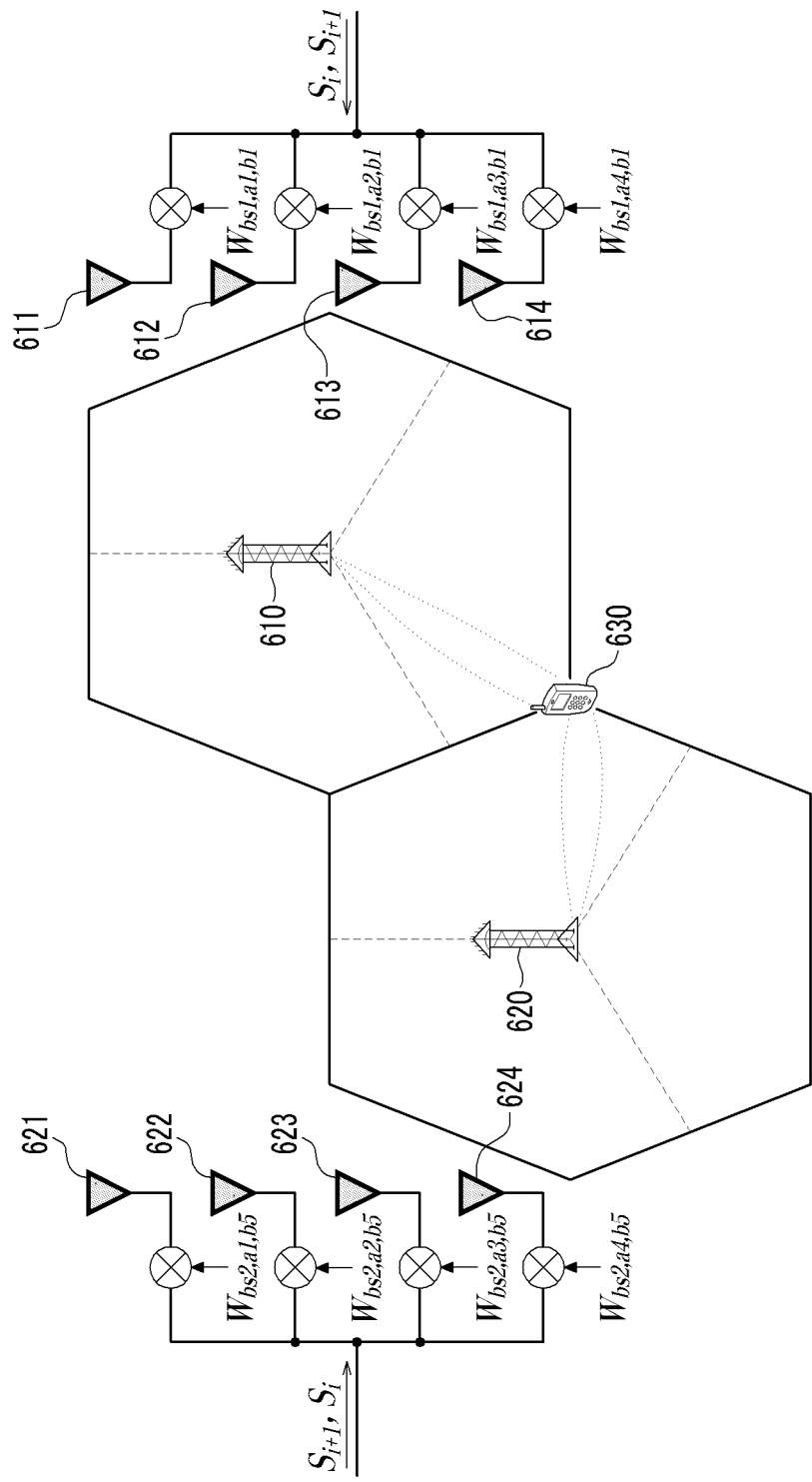
FIG. 6 illustrates a transmission scheme using a network multiple input multiple output (MIMO) scheme.
Figure 7:
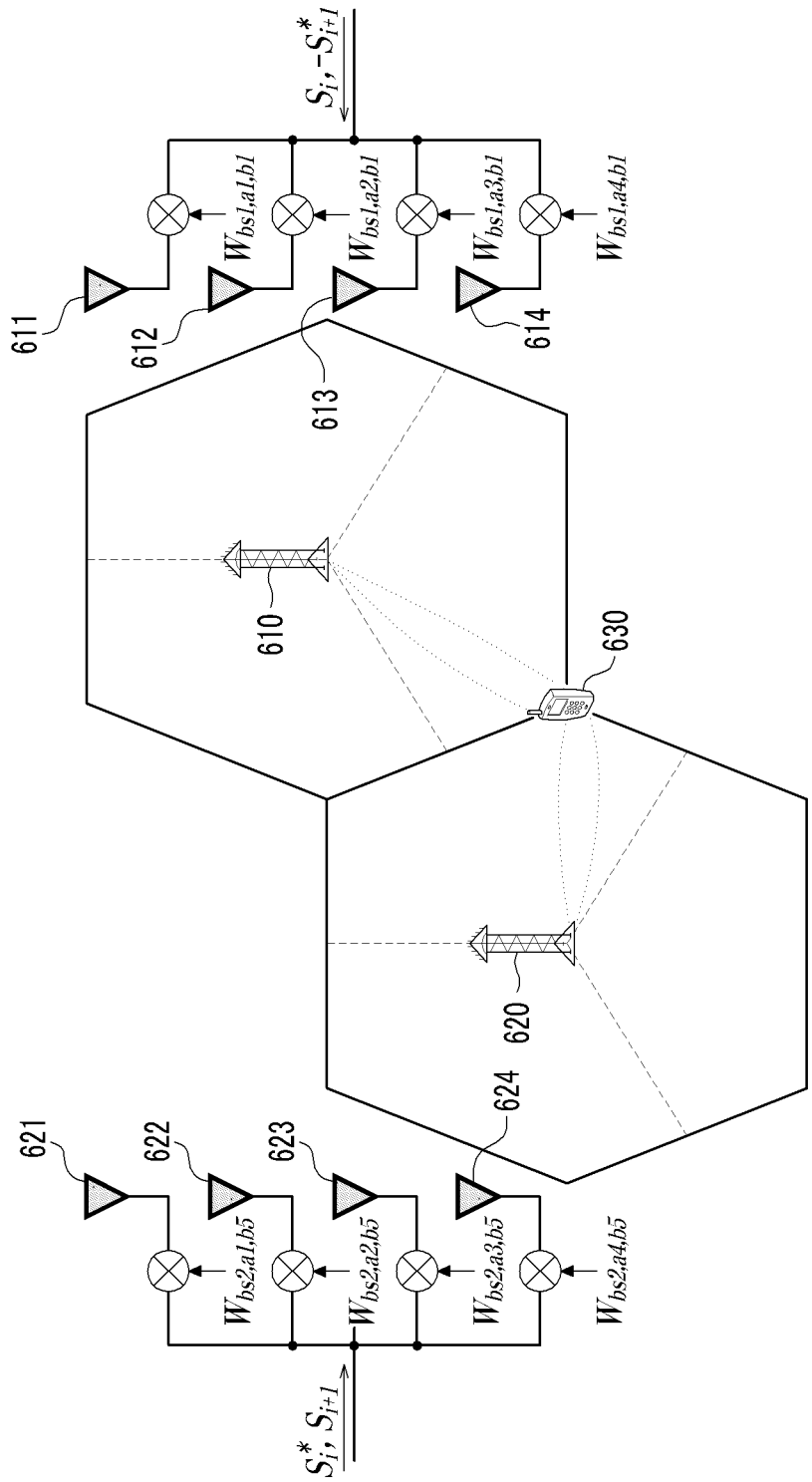
FIG. 7 illustrates a transmission scheme using a space time code (STC) scheme.

FIG. 6 illustrates a transmission scheme using a network MIMO scheme, and FIG. 7 illustrates a transmission scheme using an STC scheme.

Referring to FIGS. 6 and 7, each of base stations 610 and 620 may include a plurality of antennas, for example four antennas 611 to 614, or 621 to 624.

Here, it is assumed that the base station 610 is a serving base station of a terminal 630, the two base stations 610 and 620 classify the terminal 630 into a group corresponding to a radio resource allocation region 2 based on feedback information of the terminal 630, and a beam #1 of the base station 610 is a preferred beam of the terminal 630, while a beam #5 of the base station 620 functions as strong interference against the terminal 630.

Referring to FIG. 6, the base stations 610 and 620 transmit the same data ($S_i$, $S_{i+1}$) via the plurality of antennas 611 to 614 and 621 to 624, respectively, according to a network MIMO scheme. Here, the base station 610 multiplies the data ($S_i$, $S_{i+1}$) by beamforming weight values $[w_{bs1,a1,b1}\ w_{bs1,a2,b1}\ w_{bs1,a3,b1}\ w_{bs1,a4,b1}]^T$ of the beam #1 to transmit the multiplication result to the terminal 630 via the antennas 611 to 614, respectively. Also, the base station 620 multiplies the data ($S_i$, $S_{i+1}$) by beamforming weight values $[w_{bs2,a1,b5}\ w_{bs2,a2,b5}\ w_{bs2,a3,b5}\ w_{bs2,a4,b5}]^T$ of the beam #5 to transmit the multiplication result to the terminal 630 via the antennas 621 to 624, respectively. As described above, since the base stations 610 and 620 can cooperate to transmit the same data to the terminal 630 using the same frequency resource, it is possible to obtain macro diversity.

Referring to FIG. 7, the two base stations 610 and 620 transmit space-time coded data to the antennas 611 to 614 and 621 to 624, respectively, according to an STC scheme using beamforming. In this case, the base station 610 multiplies data ($S_i$, $-S^*_{i+1}$) by beamforming weight values $[w_{bs1,a1,b1}\ w_{bs1,a2,b1}\ w_{bs1,a3,b1}\ w_{bs1,a4,b1}]^T$ of the beam #1 to sequentially transmit the multiplication result to the terminal 630 via the antennas 611 to 614, respectively. Also, the base station 620 multiplies data ($S^*_i$, $S_{i+1}$) by beamforming weight values $[w_{bs2,a1,b5}\ w_{bs2,a2,b5}\ w_{bs2,a3,b5}\ w_{bs2,a4,b5}]$ of the beam #5 to sequentially transmit the multiplication result to the terminal 630 via the antennas 621 to 624, respectively. As described above, since the two base stations 610 and 620 can cooperate to transmit the same data to the terminal 630 using the same frequency resource through cooperation, it is possible to obtain a diversity effect according to an STC scheme.

Hereinafter, a time scheduling scheme according to an embodiment of the present invention will be described with reference to FIGS. 8 to 11.

Figure 8:
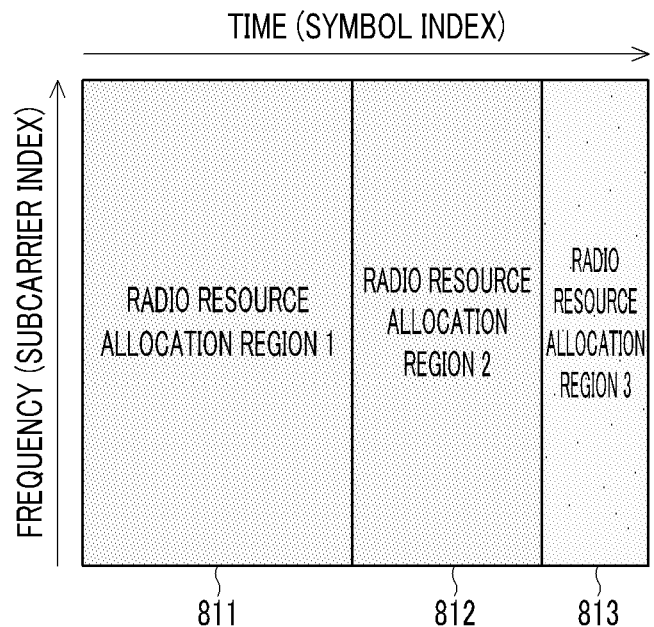
FIGS. 8 and 9 illustrate a resource scheduling scheme according to an embodiment of the present invention.
Figure 9:
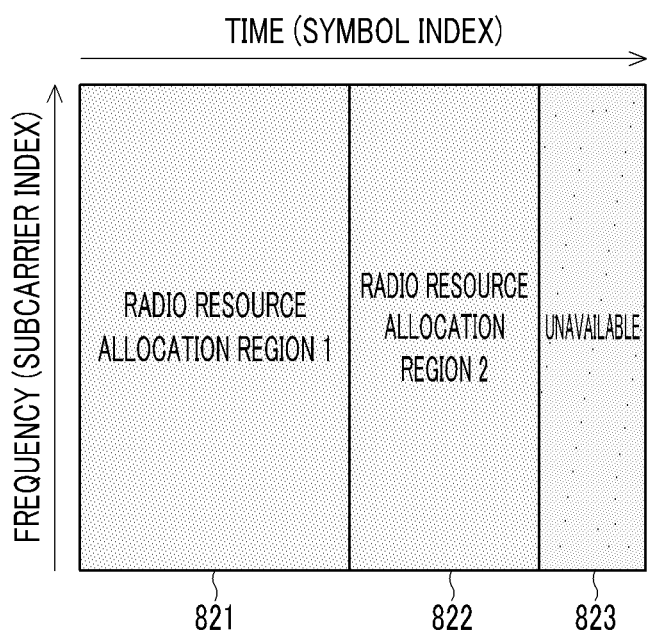
Figure 10:
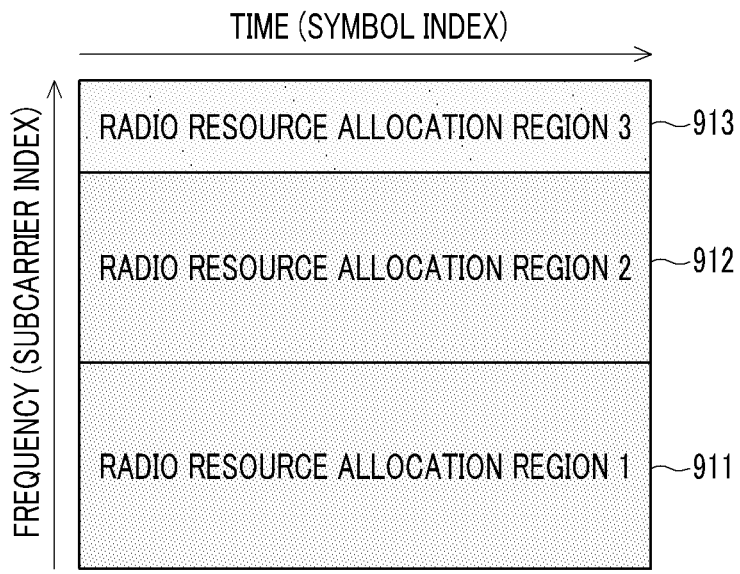
FIGS. 10 and 11 illustrate a resource scheduling scheme according to another embodiment of the present invention.
Figure 11:
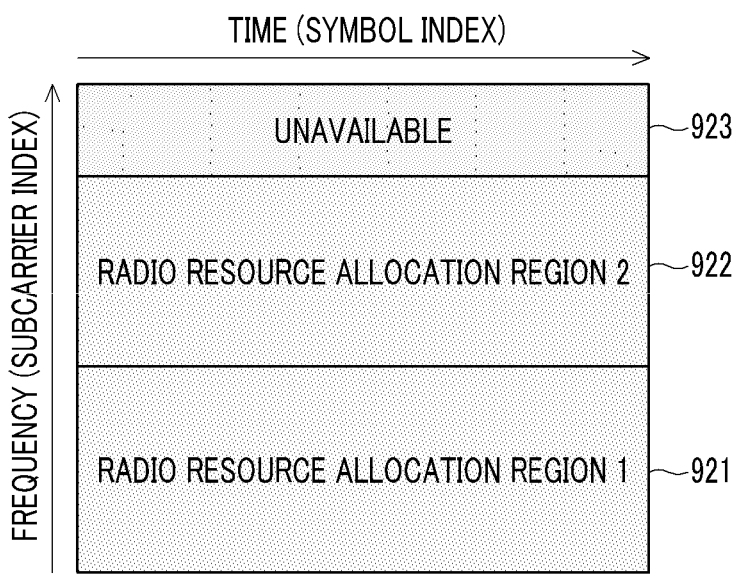

FIGS. 8 and 9 illustrate a resource scheduling scheme according to an embodiment of the present invention, and FIGS. 10 and 11 illustrate a resource scheduling scheme according to another embodiment of the present invention.

Referring to FIG. 8, one base station, for example a base station 1, divides radio resources into a plurality of groups, for example three groups 811, 812, and 813, in a time direction, i.e., a symbol index direction, and allocates radio resource allocation regions 1, 2, and 3 to the plurality of groups 811, 812, and 813, respectively. Referring to FIG. 9, the other base station, for example a base station 2, also divide the radio resources into a plurality of groups 821, 822, and 823 in the time direction, and allocates radio resource allocation regions 1, 2, and 3 to the plurality of groups 821, 822, and 823, respectively.

Referring to FIG. 10, the base station 1 divides radio resources into a plurality of groups, for example three groups 911, 912, and 913, in a frequency direction, i.e., a subcarrier index direction, and allocates radio resource allocation regions 1, 2, and 3 to the plurality of groups 911, 912, and 913, respectively. Referring to FIG. 11, the base station 2 also divides the radio resources into a plurality of groups 921, 922, and 923, in the frequency direction, and allocates radio resource allocation regions 1, 2, and 3 to the plurality of groups 921, 922, and 923, respectively.

In FIGS. 8 to 11, the radio resource allocation regions 1 and 2 may be available for both the base stations 1 and 2, whereas the radio resource allocation region 3 adopting an FFR scheme may be available for only one of the two base stations 1 and 2, for example the base station 1.

Although it has been described above that the radio resources are divided in the time direction in FIGS. 8 and 9, and the radio resources are divided in the frequency direction in FIGS. 10 and 11, the radio resources may be divided based two-dimensionally for the time and the frequency.

The above-mentioned embodiments of the present invention are not embodied only by a method and apparatus. Alternatively, the above-mentioned embodiments may be embodied by a program performing functions that correspond to the configuration of the embodiments of the present invention, or a recording medium on which the program is recorded.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

The invention claimed is:

1. A method of mitigating inter-cell interference in a base station, the method comprising:
 receiving feedback information from each of a plurality of terminals;
 grouping the plurality of terminals into a plurality of groups based on the feedback information, the plurality of groups including a first group receiving data without the base station cooperating with a neighboring base station and a second group receiving data with the base station cooperating with the neighboring base station;
 transmitting first data from the base station to a first terminal belonging to the first group without the base station cooperating with the neighboring base station; and
 transmitting second data from the base station to a second terminal belonging to the second group with the base station cooperating with the neighboring base station.

2. The method of claim 1, wherein the transmitting of the second data comprises transmitting the second data using a same resource as a resource of the neighboring base station, and
 the second data is the same as data transmitted by the neighboring base station.

3. The method of claim 2, wherein the transmitting of the second data comprises the base station transmitting the second data using a space time code (STC) scheme using beamforming through cooperation with the neighboring base station.

4. The method of claim 1, further comprising transmitting third data to a third terminal belonging to the second group among the plurality of groups through cooperation with another neighboring base station,
wherein the base station transmits the second data and the third data using a same resource as the neighboring base station and different beams.

5. The method of claim 1, further comprising the base station transmitting fourth data to a fourth terminal belonging to the second group using a beamforming scheme without the base station cooperating with the neighboring base station, while the neighboring base station transmits third data to a third terminal belonging to the second group using the beamforming scheme.

6. The method of claim 1, further comprising:
the base station transmitting third data to a third terminal belonging to a third group among the plurality of groups with the base station cooperating with the neighboring base station; and
the base station transmitting fourth data to a fourth terminal belonging to the third group among the plurality of groups with the base station cooperating with the neighboring base station, using a second resource that is different from a first resource, while transmitting the third data using the first resource.

7. The method of claim 1, further comprising distributing a resource in at least one direction of a time direction and a frequency direction to allocate the distributed resource to each of the plurality of groups.

8. The method of claim 1, further comprising the base station sharing the feedback information with the neighboring base station.

9. The method of claim 1, wherein the feedback information received from each of the plurality of terminals includes a signal to interference plus noise ratio (SINR), and information on a preferred beam among a plurality of beams of a serving base station.

10. The method of claim 9, wherein the feedback information includes at least one of an index of an interference cell and an interference beam index of the interference cell.

11. The method of claim 9, wherein an SINR of the first group is higher than an SINR of the second group.

12. A method of mitigating inter-cell interference in a terminal, the method comprising:
at the terminal, transmitting feedback information to a serving base station, wherein the terminal belongs to any one of a plurality groups divided based on the feedback information, and the plurality of groups include a first group receiving data without the serving base station cooperating with a neighboring base station and a second group receiving data with the serving base station cooperating with the neighboring base station;
at the terminal, receiving first data from the serving base station without the serving base station cooperating with the neighboring base station, when the terminal belongs to the first group; and
at the terminal, receiving second data with cooperation between the serving base station and the neighboring base station, when the terminal belongs to the second group.

13. The method of claim 12, wherein the receiving of the second data comprises receiving the second data that is transmitted using a same resource at the serving base station and the neighboring base station.

14. The method of claim 13, wherein the same resource is the same as a resource that another terminal belonging to the second group uses to receive data while the terminal receives the second data.

15. The method of claim 13, wherein the same resource is different from a resource that another terminal belonging to the second group uses to receive data while the terminal receives the second data.

16. The method of claim 12, wherein the feedback information includes at least one of a signal to interference plus noise ratio (SINR), information on a preferred beam among a plurality of beams of the serving base station, and information on an interference cell.

17. The method of claim 16, wherein an SINR of the first group is higher than an SINR of the second group.

18. A method of mitigating inter-cell interference at a base station, the method comprising:
receiving feedback information from each of a plurality of terminals;
grouping the plurality of terminals into a plurality of groups based on the feedback information, the plurality of groups including a first group receiving data without applying a network multiple input multiple output (MIMO) scheme and a second group receiving data with application of the network MIMO scheme and with the base station cooperating with a neighboring base station;
at the base station, communicating with a first terminal belonging to the first group without applying the network MIMO scheme; and
at the base station, communicating with a second terminal belonging to the second group among the plurality of groups with application of the network MIMO scheme and with the base station cooperating with the neighboring base station.

19. The method of claim 18, further comprising applying, to a third terminal belonging to a third group among the plurality of groups, a fractional frequency reuse (FFR) scheme and the network MIMO scheme with the base station cooperating with the neighboring base station.

20. The method of claim 18, wherein the feedback information includes at least one of a signal plus interference to noise ratio (SINR), information on a preferred beam among a plurality of beams of the base station, and information on an interference cell.

* * * * *